United States Patent
Hedges et al.

(10) Patent No.: US 11,186,354 B2
(45) Date of Patent: Nov. 30, 2021

(54) UNITARY DRAIN MAST

(71) Applicant: Rohr, Inc., Chula Vista, CA (US)

(72) Inventors: Nicholas Hedges, Carlsbad, CA (US);
Alberto E. Perez, Chula Vista, CA (US); Vijay V. Pujar, San Diego, CA (US); Tayelor B. McKay, San Diego, CA (US); Arun Ramachandran, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 254 days.

(21) Appl. No.: 16/404,270

(22) Filed: May 6, 2019

(65) Prior Publication Data

US 2020/0354037 A1 Nov. 12, 2020

(51) Int. Cl.
*B64C 1/14* (2006.01)
*F01D 25/32* (2006.01)

(52) U.S. Cl.
CPC ............ *B64C 1/1453* (2013.01); *F01D 25/32* (2013.01)

(58) Field of Classification Search
CPC .......... B64C 1/1453; F16L 3/123; F16L 3/04; F16L 5/10; F16L 5/14
See application file for complete search history.

(56) References Cited

U.S. PATENT DOCUMENTS

| | | | |
|---|---|---|---|
| 4,715,561 A * | 12/1987 | Spinosa | B64C 1/1453 137/430 |
| 5,285,636 A | 2/1994 | Mayo | |
| 5,290,996 A | 3/1994 | Giamati | |
| 5,511,573 A * | 4/1996 | Corte | F16K 27/12 137/15.08 |
| 6,578,361 B1 | 6/2003 | Higginbotham | |
| 7,055,863 B1 * | 6/2006 | Commeville | E03C 1/042 137/359 |
| 8,898,974 B1 * | 12/2014 | Gardner | H02G 3/00 52/220.8 |
| 2008/0181770 A1 | 7/2008 | Russell | |
| 2011/0121137 A1 | 5/2011 | Sandiford | |
| 2014/0260013 A1 * | 9/2014 | de Freitas Silvestre | E04G 15/061 52/220.8 |
| 2015/0075662 A1 | 3/2015 | Lee et al. | |
| 2015/0329195 A1 | 11/2015 | Wielgosz | |
| 2015/0337993 A1 | 11/2015 | Velarde | |
| 2016/0047274 A1 | 2/2016 | Woolworth et al. | |
| 2017/0176092 A1 * | 6/2017 | Naik | F25D 23/061 |
| 2017/0259900 A1 | 9/2017 | Lee et al. | |
| 2018/0111673 A1 | 4/2018 | Casado Montero et al. | |
| 2018/0258851 A1 | 9/2018 | Ribarov et al. | |
| 2018/0265210 A1 | 9/2018 | Leachman | |

(Continued)

FOREIGN PATENT DOCUMENTS

EP 0757142 A1 * 2/1997 ............... H02G 3/22

OTHER PUBLICATIONS

EP search report for EP19212695.1 dated Jul. 3, 2020.

*Primary Examiner* — Christopher D Hutchens
(74) *Attorney, Agent, or Firm* — Getz Balich LLC

(57) ABSTRACT

A drain mast is provided that includes a unitary structure having a first housing, a second housing, and a plurality of tubes extending between the first housing and the second housing. The unitary structure is configured to provide a plurality of fluid paths through the drain mast, each fluid path extending through the first housing, one of the plurality of tubes, and the second housing.

18 Claims, 6 Drawing Sheets

(56) References Cited

U.S. PATENT DOCUMENTS

2018/0283217 A1 10/2018 de Pau, Jr. et al.
2019/0276131 A1* 9/2019 Parker .................. B64C 1/1453

* cited by examiner

UNITARY DRAIN MAST

BACKGROUND OF THE INVENTION

1. Technical Field

The present disclosure relates to aircraft fluid drainage systems in general, and to drain masts providing fluid drainage between compartments within an aircraft system in particular.

2. Background Information

Aircraft nacelles and/or auxiliary power unit (APU) compartments typically include a system configured to collect errant fluids (e.g., water, hydraulic oil, fuel, etc.) leaked or otherwise present within the nacelle or APU compartment and to drain those collected fluids to the exterior of the nacelle or aircraft. Using a nacelle as an example, a typical nacelle fluid drainage system includes a plurality of drain tubes, each extending from a different collection point on or near the engine or other points within the nacelle. Each drain tube may be configured to collect and drain particular types of fluid. For example, a first drain tube may be configured to collect water drawn into the nacelle, a second drain tube may be configured to collect fuel leaked within the nacelle, a third drain tube may be configured to collect hydraulic fluid leaked within the nacelle, and so forth. One or more of these fluids may be flammable. The respective drain tubes may be collectively routed to a structure referred to as a "drain mast" for passage to the exterior of the nacelle. In some instances, the drain mast may extend across a plurality of compartments within the nacelle, and some of those compartments may have different fire zone ratings; e.g., "Designated Fire Zone" or "DFZ", "Flammable Fluid Leakage Zone" or "FFLZ", etc. Hence, drain masts often provide a structure that permits safe and contained drainage of flammable fluids within and through aircraft fire zones, one that provides fluid sealing between adjacent compartments, and one that satisfies fire seal requirements between adjacent compartments. Some prior art drain systems provide sealing between adjacent compartments with the nacelle by use of rubber blocks coupled with fire-resistant panels at least partially enclosing the rubber blocks. These style drain masts were often assemblies consisting of a large number of individual parts that were difficult to produce, install, and maintain.

What is needed is a drain mast that provides the requisite sealing between adjacent compartments, and one that is easier and less expensive to produce, install, and maintain.

SUMMARY OF THE INVENTION

According to an aspect of the present disclosure, a drain mast is provided. The drain mast includes a unitary structure having a first housing, a second housing, and a plurality of tubes extending between the first housing and the second housing. The unitary structure is configured to provide a plurality of fluid paths through the drain mast, each fluid path extending through the first housing, one of the plurality of tubes, and the second housing.

In any of the aspects or embodiments described above and herein, the first housing may include a first peripheral wall and a first header panel integrally formed with the first peripheral wall, the first peripheral wall may have a first enclosed configuration, and the first header panel may include a plurality of first apertures, and each fluid path may extend through one of the first apertures.

In any of the aspects or embodiments described above and herein, the first header panel may have a first surface and a second surface, and the first peripheral wall may have an interior surface and an exterior surface. The second surface of the first header panel and the interior surface of the first peripheral wall may define an interior region of the first housing, and the tubes may extend within the interior region to the second surface of the first header panel.

In any of the aspects or embodiments described above and herein, the first housing may include a plurality of connector segments, each connector segment aligned with a respective one of the first apertures, and each said connector segment may be a portion of the respective fluid path extending through the aligned first aperture.

In any of the aspects or embodiments described above and herein, the first peripheral wall may have a first end and a distal second end, and the first header panel may be integrally formed with the first peripheral wall adjacent the first end of the first peripheral wall.

In any of the aspects or embodiments described above and herein, the second housing may include a second peripheral wall and a second header panel integrally connected to the second peripheral wall, the second peripheral wall may have a second enclosed configuration, and the second header panel may have a plurality of second apertures, and each fluid path may extend through one of the second apertures.

In any of the aspects or embodiments described above and herein, the second header panel may have a first surface and a second surface, and the second peripheral wall may have an interior surface and an exterior surface. The second surface of the second header panel and the interior surface of the second peripheral wall may define an interior region of the second housing.

In any of the aspects or embodiments described above and herein, the second housing may include a plurality of drain tube segments, each drain tube segment aligned with a respective one of the second apertures, and each said connector segment may be a portion of the respective fluid path extending through the aligned second aperture.

In any of the aspects or embodiments described above and herein, the second peripheral wall may have a first end and a distal second end, and the second header panel may be integrally formed with the second peripheral wall adjacent the second end of the second peripheral wall.

In any of the aspects or embodiments described above and herein, the second header panel may include a first segment and a second segment, the first segment and the second segment collectively forming the second header panel.

In any of the aspects or embodiments described above and herein, the first housing may include a plurality of connector segments, and the second housing may include a plurality of drain tube segments, and the drain mast may include a plurality of indicators, each indicator associated with at least one of a respective one of the connector segments, a respective one of the drain tube segments, or a respective one of the tubes.

In any of the aspects or embodiments described above and herein, the unitary structure may comprise a single material.

According to another aspect of the present disclosure, a drain mast is provided that includes a single material unitary structure having a first housing, a second housing, and a plurality of tubes, wherein the first housing and the second housing are separated from one another and the plurality of tubes extend between the first housing and the second housing. The unitary structure may be configured to provide a plurality of fluid paths through the drain mast, each fluid path extending through the first housing, one of the plurality of tubes, and the second housing.

In any of the aspects or embodiments described above and herein, the first housing may include a first peripheral wall and a first header panel integrally formed with the first peripheral wall, and the first header panel may include a plurality of first apertures. The second housing may include a second peripheral wall and a second header panel integrally formed with the second peripheral wall, and the second header panel may include a plurality of second apertures. Each fluid path may extend through a respective one of the first apertures, a respective one of the plurality of tubes, and a respective one of the second apertures.

In any of the aspects or embodiments described above and herein, the single material unitary structure may comprise an additively manufactured material.

According to another aspect of the present disclosure, a drain mast is provided that includes a first header panel, a second header panel, at least one enclosure wall, and a plurality of tubes. The first header panel, the second header panel, the plurality of tubes, and the at least one enclosure wall may be integrally formed as a unitary structure, and the first header panel is separated from the second header panel. The first header panel, the second header panel, and the at least one enclosure wall may collectively define an enclosed interior compartment. The plurality of tubes may extend between the first header panel and the second header panel within the interior compartment. The drain mast may be configured to provide a plurality of fluid paths through the drain mast, each fluid path extending through the first header panel, one of the plurality of tubes, and the second header panel.

In any of the aspects or embodiments described above and herein, the at least one enclosure wall may have a first end and a distal second end, and the first header panel may be integrally formed with the at least one enclosure wall adjacent the first end.

In any of the aspects or embodiments described above and herein, the at least one enclosure wall may have a first end and a distal second end, and the second header panel may be integrally formed with the at least one enclosure wall adjacent the second end.

In any of the aspects or embodiments described above and herein, the drain mast may be configured to contain fluids disposed outside of the tubes within the interior compartment.

In any of the aspects or embodiments described above and herein, the drain mast may include a drainage port disposed within the second header panel, wherein the drainage port may be configured to receive the fluids disposed outside of the tubes within the interior compartment, and provide a fluid passage outside of the interior compartment.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
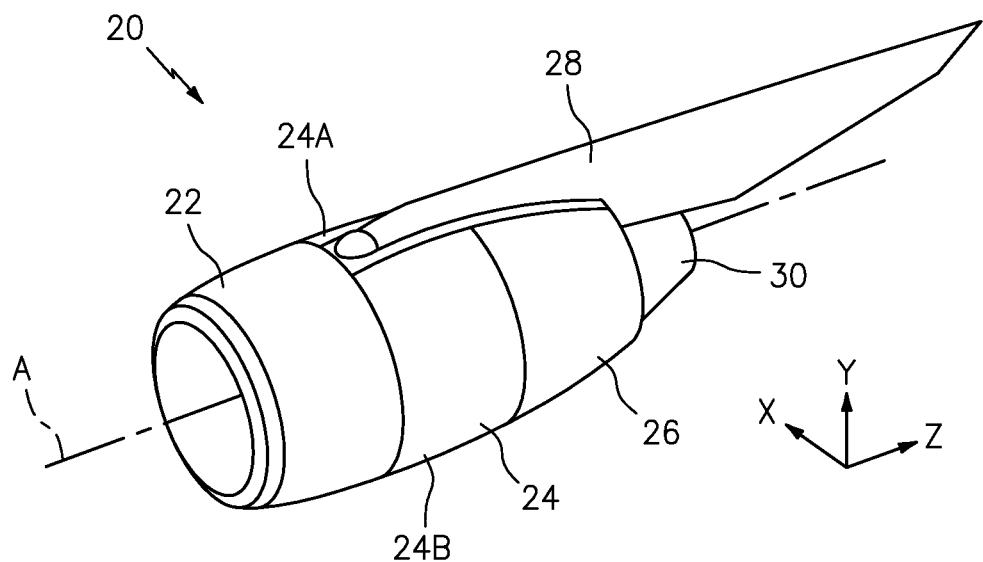
FIG. 1 is a perspective view of an aircraft nacelle.

Referring to FIG. 1, a nacelle 20 for a gas turbine engine is illustrated according to various embodiments. The nacelle 20 may be used on an aircraft. The nacelle 20 may have a centerline A-A', and may include an inlet 22, a fan cowl 24, and a thrust reverser 26. The fan cowl 24 may comprise two halves pivotally mounted to pylon 28, via one or more hinges. In this regard, the fan cowl 24 may comprise a first fan cowl 24A (also referred to as a right-hand (RH) fan cowl) and a second fan cowl 24B (also referred to as a left-hand (LH) fan cowl). In various embodiments, an exhaust nozzle 30 may extend from a turbine engine mounted within the nacelle 20. The nacelle 20 may be coupled to a pylon 28, which may in turn mount the nacelle 20 to an aircraft wing or aircraft body.

Figure 2:
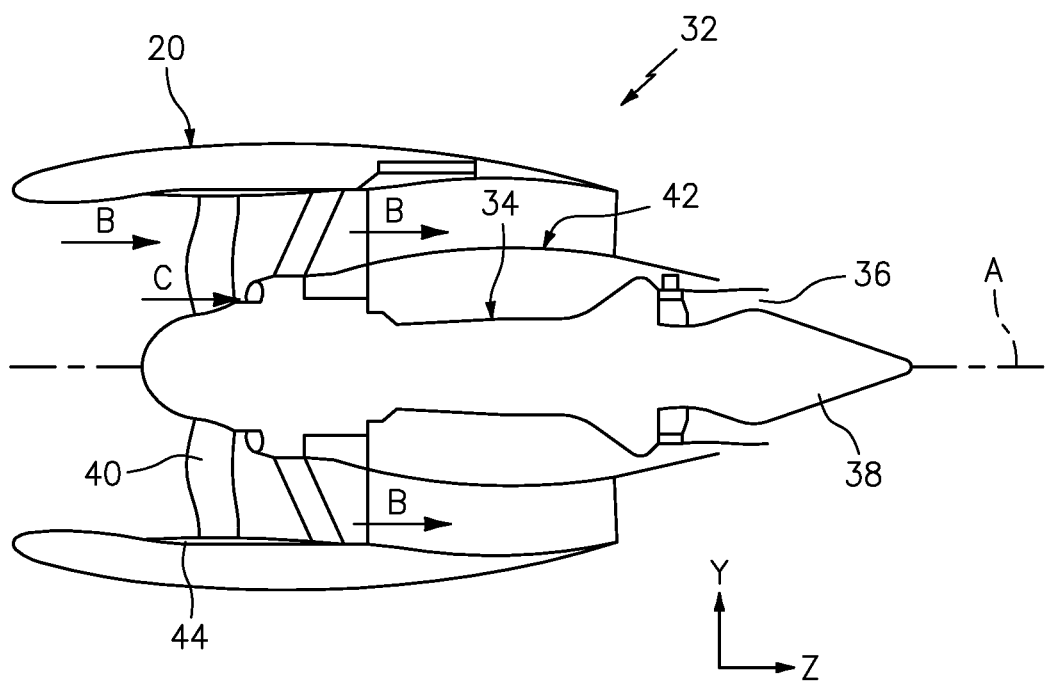
FIG. 2 is a diagrammatic view of a gas turbine engine nacelle.

FIG. 2 illustrates a schematic view of a gas turbine engine 32 within a nacelle 20, in accordance with various embodiments. The orthogonal XYZ-axes are provided to facilitate the description herein. The gas turbine engine 32 may include a core engine 34. Core air flow C flows through core engine 34 and is expelled through the exhaust outlet 36 surrounding tail cone 38. The core engine 34 drives a fan 40 arranged in a bypass flow path B. Air with in the bypass flow-path B flows in the aft direction (z-direction) along bypass flow-path B. At least a portion of the bypass flow path B may be defined by the nacelle 20 and the inner fixed structure (IFS) 42. A fan case 44 may surround the fan 40. The fan case 44 may be housed within a fan nacelle 20. The fan 40 may rotate about an engine centerline axis A-A'.

A drain mast 46 according to the present disclosure as will be described herein may be configured for use in a gas turbine engine nacelle, within an APU compartment, or within any similar compartment of an aircraft that includes a drainage system. To facilitate the description herein, the present disclosure drain mast 46 is described below in the context of a nacelle application, but the present disclosure drain mast 46 is not limited to a nacelle applications.

Referring to FIGS. 3, 3A, 3B, and 4, a drain mast 46 according to the present disclosure is a unitary structure that includes a first housing 48, a second housing 50, and a plurality of tubes 52. The first housing 48 and the second housing 50 are spaced apart from one another. The tubes 52 extend between the first and second housings 48, 50. The first housing 48 includes at least one peripheral wall 54 and at least one header panel 56. The peripheral wall 54 has an interior surface 58, an exterior surface 60, a first end 62, and a distal second end 64. The second end 64 is disposed on the side facing the second housing 50. The interior and exterior surfaces 58, 60 may each extend between the first and second ends 62, 64. The peripheral wall 54 has an enclosed configuration that in part defines an interior region 65 of the first housing 48. For example, in the exemplary drain mast 46 embodiment shown in FIGS. 3, 3A, 3B, and 4, the peripheral wall 54 is a single wall extending in a substantially oval configuration. In other embodiments, the peripheral wall 54 may have a plurality of segments that collectively form the enclosed configuration. As will be explained below, in some embodiments the first housing peripheral wall 54 may be configured to cooperate with, or be a part of, a structure that forms a fluid seal, a fire seal, or both between adjacent compartments within the nacelle.

Figure 3:
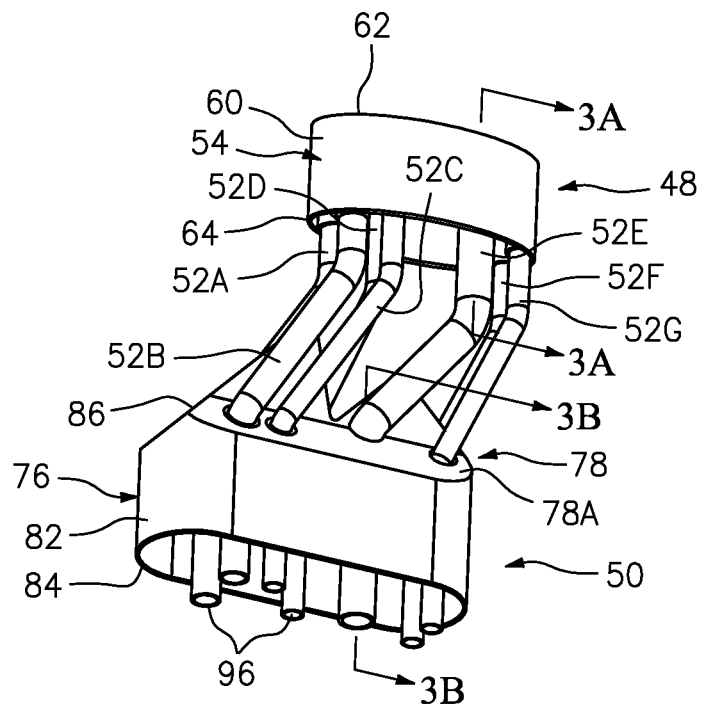
FIG. 3 is a perspective view of a drain mast embodiment.
Figure 3A:
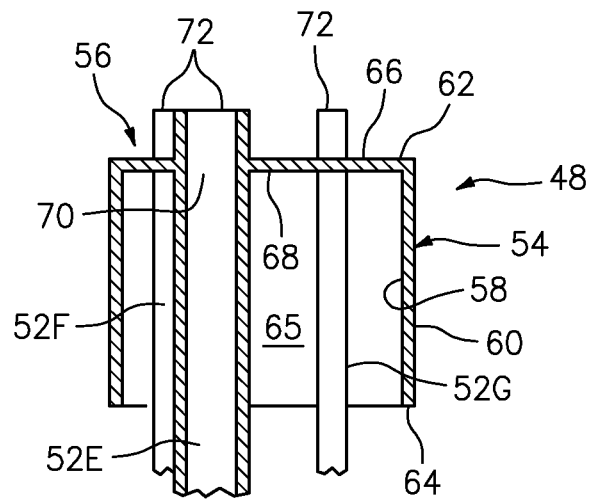
FIG. 3A is a sectioned view of the first housing portion of the drain mast embodiment shown in FIG. 3 along cut line 3A-3A.
Figure 3B:
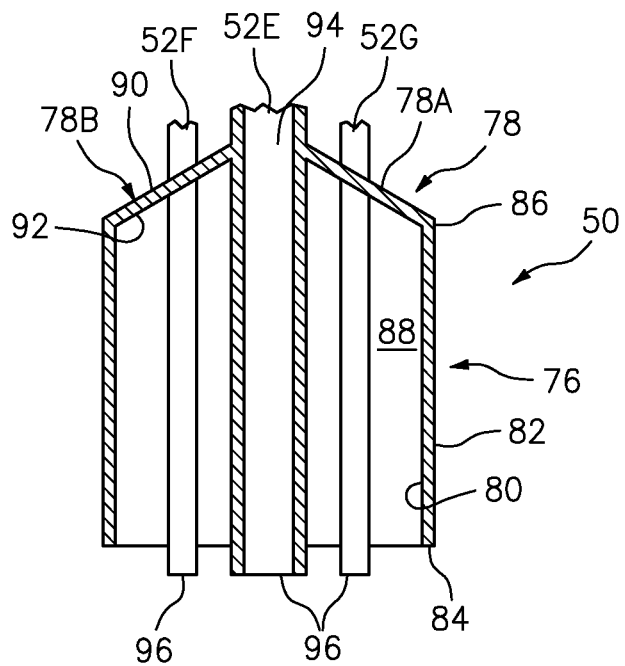
FIG. 3B is a sectioned view of the second housing portion of the drain mast embodiment shown in FIG. 3 along cut line 3B-3B.
Figure 4:
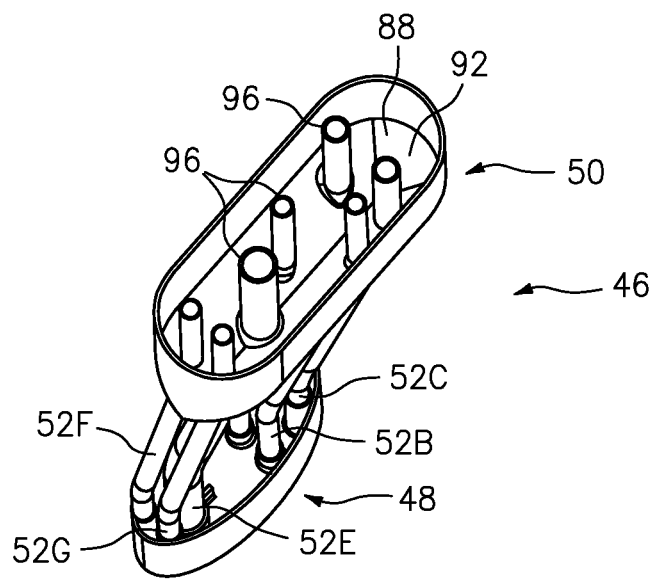
FIG. 4 is a rotated perspective view of the drain mast embodiment shown in FIG. 3.

The first housing header panel 56 is integrally connected with the peripheral wall 54 around the entire perimeter of the peripheral wall 54, and may be disposed at or adjacent the first end 62 of the peripheral wall 54. In such embodiments, the header panel 56 encloses one end of the first housing 48 and provides a barrier that prevents fluid and/or fire migration through the first housing 48. In alternative embodiments, the header panel 56 may be integrally connected with the peripheral wall 54 at other positions between the first and second ends 62, 64 of the peripheral wall 54. The header panel 56 includes a first surface 66 and an opposite second surface 68. The second surface 68 defines a portion of the interior region 65 of the first housing 48. The header panel 56 includes a plurality of apertures 70 extending between the first and second surfaces 66, 68, one for each tube 52 within the drain mast 46. On the first surface 66 of the header panel 56, a plurality of hollow connector segments 72 extend outwardly from the header panel 56. Each connector segment 72 is aligned with a respective one of the apertures 70 disposed in the header panel 56. On the second surface 68 of the header panel 56, each tube 52 is aligned with a respective one of the apertures 70, and extends outwardly from the header panel 56. Collectively, each aligned connector segment 72, header panel aperture 70, and tube 52 is part of a unitary structure that defines a fluid path through the first housing 48. Hence, there is no need for a seal disposed around a tube passing through the first housing header panel 56. FIGS. 3 and 4 illustrate a drain mast 46 embodiment that includes a plurality of tubes 52 (e.g., tubes 52A-52G) extending between the first housing 48 and the second housing 50. The present disclosure drain masts are not limited to having any particular number of tubes 52. FIG. 3A is sectional cut view taken through tube 52E within the first housing 48, and FIG. 3B is sectional cut view taken through tube 52E within the second housing 50.

Each of the connector segments 72 extending outwardly from the first housing header panel 56 may be configured for attachment to a drain tube 74 (See FIG. 9) extending from a collection point on or near the engine or other points within the nacelle. Each connector segment 72 may be, for example, configured with a portion of a threaded connector that permits connection/disconnection of that connector segment 72 with a corresponding drain tube 74. The present disclosure is not limited to any particular connector segment 72 configuration.

The second housing 50 includes at least one peripheral wall 76 and at least one header panel 78. The peripheral wall 76 has an interior surface 80, an exterior surface 82, a first end 84, and a distal second end 86. The second end 86 is disposed on the side facing the first housing 48. The interior and exterior surfaces 80, 82 may each extend between the first and second ends 84, 86. The peripheral wall 76 has an enclosed configuration that defines an interior region 88 of the second housing 50. For example, in the exemplary drain mast 46 embodiment shown in FIGS. 3, 3A, 3B, and 4, the second housing peripheral wall 76 is a single wall extending in a substantially oval configuration. In other embodiments, the peripheral wall 76 may have a plurality of segments that collectively form the enclosed configuration. As will be explained below, in some embodiments the second housing peripheral wall 76 may be configured to cooperate with, or be a part of, a structure that forms a fluid seal, a fire seal, or both.

The second housing header panel 78 is integrally connected with the second housing peripheral wall 76 around the entire perimeter of the peripheral wall 76, and may be disposed at or adjacent the second end 86 of the peripheral wall 76. The second housing header panel 78 embodiment shown in FIGS. 3, 3A, 3B, and 4 may be described as "tented", having a first portion 78A and a second portion 78B disposed at an angle relative to one another (i.e., the first and second portions 78A, 78B are not coplanar). Hence, the first and second portions 78A, 78B of the second housing header panel 78 are connected together, and each is connected to the peripheral wall 76. The second housing header panel 78 encloses one end of the second housing 50 and provides a barrier that prevents fluid and/or fire migration through the second housing 50. The present disclosure is not limited to any particular second housing header panel 78 configuration, other than one that encloses the second housing 50 and provides a barrier that prevents fluid and/or fire migration through the second housing 50.

The second housing header panel 78 includes a first surface(s) 90 and an opposite second surface(s) 92. The second surface 92 defines a portion of the interior region 88 of the second housing 50. The second housing header panel 78 includes a plurality of apertures 94 extending between the first and second surfaces 90, 92, one for each tube 52 within the drain mast 46. On the second surface 92 of the second housing header panel 78, a plurality of drain tube segments 96 extend outwardly from the header panel 78. Each drain tube segment 96 is aligned with a respective one of the apertures 94 disposed in the second housing header panel 78. On the first surface 90 of the header panel 78, each of the plurality of tubes 52 is aligned with a respective one of the apertures 94, and extends outwardly from the header panel 78. Collectively, each aligned drain tube segment 96, second housing header panel aperture 94, and tube 52 is part of a unitary structure that defines a fluid path through the second housing 50. Hence, there is no need for a seal disposed around a tube passing through the second housing header panel 78.

Figure 5:
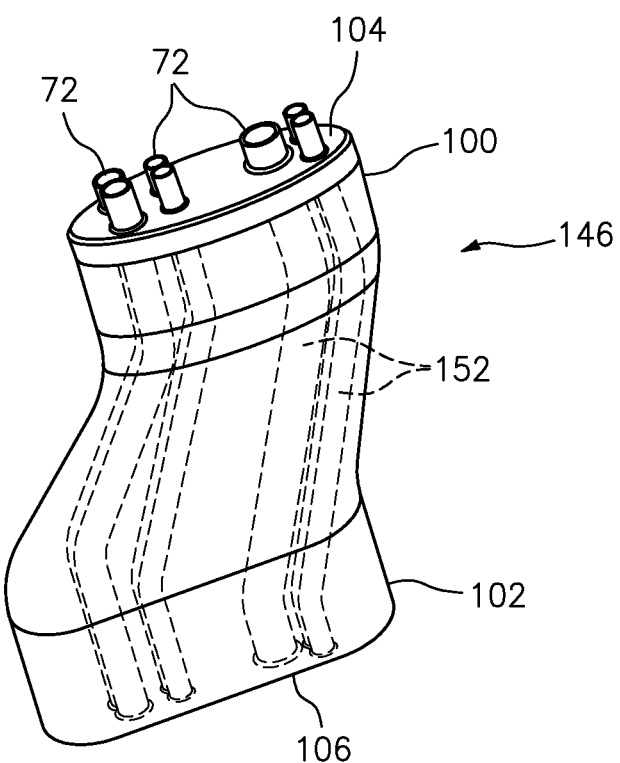
FIG. 5 is a perspective view of a drain mast embodiment.
Figure 6:
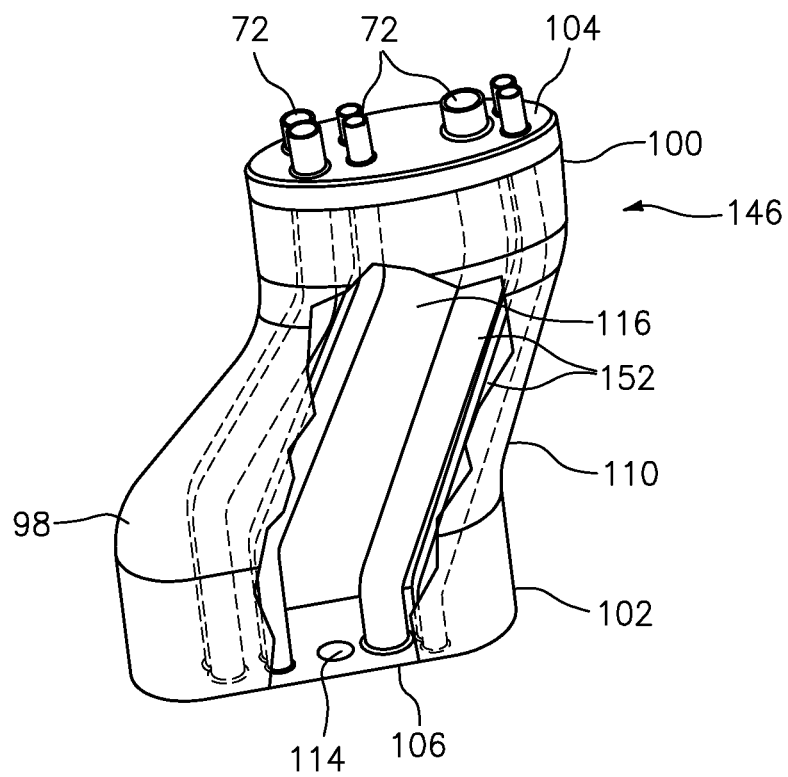
FIG. 6 is a partially sectioned view of the drain mast embodiment shown in FIG. 5 shown in a nacelle application.

FIGS. 5 and 6 illustrate an alternative embodiment of the present disclosure drain mast 146 that is also a unitary structure. In this embodiment, the drain mast 146 includes a single enclosed housing 98 extending between a first end 100 and a second end 102, a first header panel 104, a second header panel 106, and a plurality of tubes 152 (or other forms of fluid conduits) that extend internally within the enclosed housing 98 between the first and second ends 100, 102. The first header panel 104 may disposed at or adjacent the first end 100 and the second header panel 106 may be disposed at or adjacent the second end 102. The enclosed housing 98 is formed by one or more walls that collectively define the enclosed housing 98. The enclosed housing 98, the first header panel 104, and the second header panel 106 define an enclosed interior compartment 116. In some embodiments, the enclosed interior compartment 116 may be hollow, including only the tubes 152 extending between the first and second header panels 104, 106. Alternatively, the interior compartment 116 may not be completely hollow and may for example, include structural elements that support the tubes 152 and create interior sub-compartments within the interior compartment 116, or the interior compartment 116 may be filled with a lightweight material (e.g., a porous material) that provides structural support to the tubes 152 and to the drain mast 146 housing itself, or the like. Like other embodiments of the present disclosure drain mast 46, 146, these embodiments may include a plurality of connector segments 72 extending outwardly from the first header panel 104, and/or a plurality of drain tube segments 96 (e.g., see FIG. 3) extending outwardly from the second header panel 106. The present disclosure is not limited to the above described alternative drain mast 146 embodiment. The enclosed housing 98 of the drain mast 146 embodiments described with respect to FIGS. 5 and 6 may provide additional benefits. For example, as described above a drain mast can extend across a plurality of nacelle compartments (e.g., compartments 108, 110—See FIG. 9), and each nacelle compartment may be a designated fire zone ("DFZ"). Embodiments of the present drain mast 146 can be configured to prevent fluid leakage between adjacent nacelle compartments, and can be configured to provide one or more passages for flammable liquids such as hydraulic oil, fuel, oil, etc. through a nacelle compartment. The enclosed housing 98 of the drain mast 146 embodiments described with respect to FIGS. 5 and 6 provides a barrier between the nacelle compartment and the tubes 152 themselves; i.e., the tubes 152 are disposed within interior compartment 116. Hence, the enclosed housing 98 provides a barrier between the environment in the nacelle compartment (e.g., See also FIG. 9, nacelle compartment 110) and the tubes 152; e.g., potentially separating the tubes 152 from an elevated temperature or flame within the nacelle compartment 110. Furthermore, the interior compartment 116 can also function to restrict the flow of fluids, preventing their distribution into the nacelle compartment 110. For example in the event a fluid leak (e.g., via a ruptured tube 152) is developed within the interior compartment 116, the enclosed housing 98 may be configured to prevent such leaked fluid from exiting the enclosed housing 98 and passing into the nacelle compartment 110. The drain mast 146 may include a mechanism operable to collect the fluids leaked within the enclosed housing 98, and direct those collected fluids away from the drain mast 146 appropriately. For example, in the drain mast 146 embodiment shown in FIG. 6, the drain mast 146 includes a drainage port 114 disposed in the second header panel 106 that may be fluidly connected to a drain tube segment 96. Hence, fluid leaked within the enclosed housing 98 may be collected and safely drained to the exterior of the nacelle via the drainage port 114.

Figure 7:
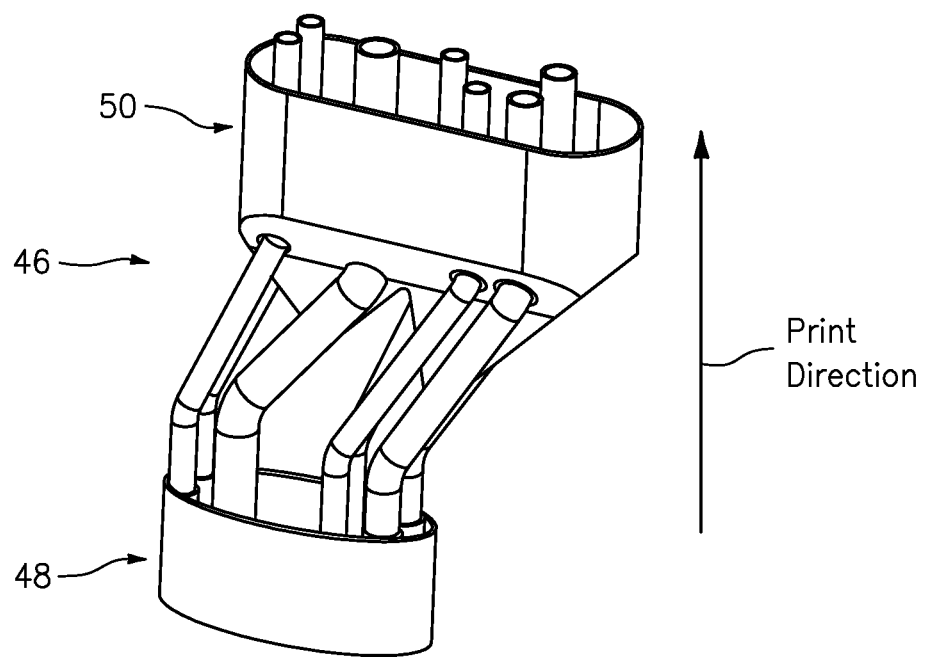
FIG. 7 is a perspective view of the drain mast embodiment shown in FIG. 3, illustrating a print direction that may be used in an additive manufacturing methodology.
Figure 8:
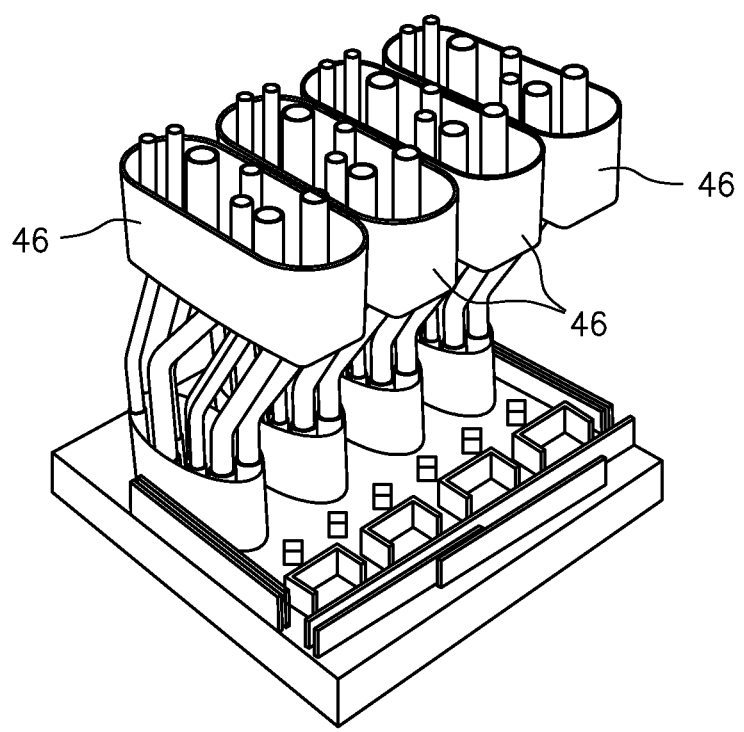
FIG. 8 shows a plurality of drain mast embodiments produced using an additive manufacturing methodology.

An additive manufacturing process may be used to produce present disclosure drain mast 46, 146 embodiments as a unitary structure. A variety of different additive manufacturing processes are known and may be used. A specific example of an acceptable additive manufacturing process is one that utilizes a laser powder bed fusion technique. A drain mast 46, 146 according to the present disclosure may be comprised of a number of different materials and is therefore not limited to any particular material. In those instances wherein a present disclosure drain mast 46, 146 is produced via an additive manufacturing process such as a laser powder bed fusion, the drain mast 46, 146 may be produced using an Inconel 625 alloy powder or the like. FIG. 7 provides a diagrammatic view of a present disclosure drain mast 46 embodiment that may be formed using an additive manufacturing process. FIG. 7 also indicates a print direction that may be used in such an additive manufacturing process. FIG. 8 illustrates a plurality of present disclosure drain mast 46 embodiments that have been produced using an additive manufacturing process in a batch mode; e.g., in a single print. The ability to produce a plurality of present disclosure drain masts 46 in a single operation illustrates the manufacturability of the present disclosure drain masts 46.

Aspects of the present disclosure resolve numerous issues associated with prior art drain masts. As indicated above, drain masts are often required to provide fluid passages between different compartments within a nacelle, and those compartments often have different fire zone ratings. Hence, drain masts are often relied upon to create at least a part of fluid and fire sealing between adjacent compartments. Prior art drain systems providing sealing between adjacent compartments often included a large number of individual parts that were difficult to produce, install, and maintain. Present disclosure drain masts 46, 146 in contrast, have a unitary structure and thereby provide a one piece firewall, seal land and flammable fluids drain control center. Hence, there is no need to provide independent tubes 52, or seals for independent tubes 52, configured in a manner that controls fluid leakage or inhibits fire propagation between adjacent compartments. The absence of independent tubes and tube seals substantially decreases efforts that would otherwise be associated with installing the independent tubes, tube seals, installing the drain mast 46, 146 and maintaining the drain mast 46, 146.

Figure 9:
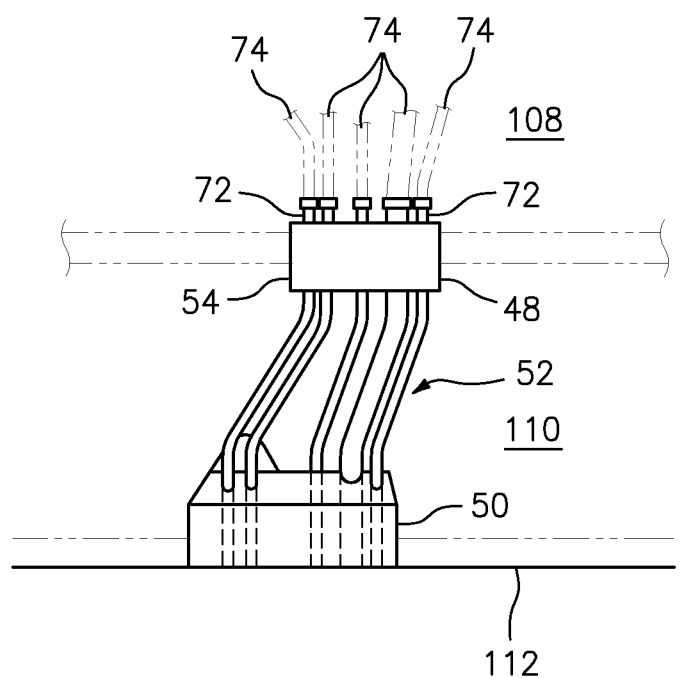
FIG. 9 is a diagrammatic view of a present disclosure drain mast embodiment disposed within a nacelle application having a first fire zone and a second fire zone.

FIG. 9 diagrammatically illustrates a present disclosure drain mast 46 embodiment in a nacelle application. The first housing 48 is positioned at the interface between a first fire zone compartment 108 and a second fire zone compartment 110. Drainage tubes 74 from various collection points within the nacelle extend into the first fire zone compartment 108 and connect with the connector segments 72 extending outwardly from the first housing 48. The peripheral wall 54 of the first housing 48 provides a sealing surface for the interface between the first and second fire zone compartments 108, 110. The unitary structure of the connector segments 72, header panel 56, and tubes 52 define a fire seal and a leak-free fluid path. The second housing 50 is positioned at an exterior panel 112 of the nacelle. The peripheral wall 76 of the second housing 50 provides a sealing surface with the exterior panel 112. Here again, the unitary structure of the second housing 50 components define a fire seal and a leak-free fluid path.

In some embodiments of the present disclosure, the tubes 52, the connector segments 72, or the drain tube segments 96, or any combination thereof, may include integral indicators (e.g., labels) that identify the drain tube and/or the collection point that it is associated with in the nacelle. For example, these indicators may be integrated into the design of the drain mast. And/or may be printed on the drain tubes concurrently during the manufacturing of the tubes, etc. The indicators may facilitate installation of the drain mast 46, maintenance efforts associated with the drain mast 46, and/or diagnostic trouble shooting. In some embodiments of the present disclosure drain masts 46, one or more sensors may be associated with particular drain tubes within the drain mast 46. The sensors may be configured to provide an indication of fluid flow within the tube, and thereby provide an indication of potential leakage within the nacelle. The aforesaid sensors may be implemented as part of a prognostic health monitoring ("PHM") system.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

As stated above, embodiments of the present disclosure drain mast 46, 146 are described above in the context of a gas turbine engine nacelle application to facilitate the description herein, but the present disclosure drain mast 46, 146 embodiments are not limited to a nacelle application. The present disclosure drain mast 46, 146 embodiments may be used in a variety of different applications (e.g., APU compartments, etc.) where safe and contained drainage of fluids, including flammable fluids, within and through aircraft fire zones, and/or fluid sealing between adjacent compartments, and/or fire sealing between adjacent compartments is desired. The present disclosure drain mast 46, 146 embodiments provide particular utility in gas turbine engine nacelle applications, but are not limited thereto. [0057] What is claimed is:

What is claimed is:

1. A drain mast, comprising:
 a unitary structure comprising a first housing, a second housing, and a plurality of tubes extending between the first housing and the second housing;
 wherein the unitary structure is configured to provide a plurality of fluid paths through the drain mast, each fluid path extending through the first housing, one of the plurality of tubes, and the second housing;
 wherein the first housing includes a first peripheral wall and a first header panel integrally formed with the first peripheral wall, the first peripheral wall has a first enclosed configuration, and the first header panel includes a plurality of first apertures, and each respective fluid path extends through a respective one of the first apertures; and
 wherein the unitary structure further comprises a plurality of connector segments extending outwardly from the first header panel away from the plurality of tubes, each connector segment aligned with a respective one of the first apertures, and each said connector segment is a portion of the respective fluid path extending through the aligned first aperture.

2. The drain mast of claim 1, wherein the first header panel has a first surface and a second surface, and the first peripheral wall has an interior surface and an exterior surface;
 wherein the second surface of the first header panel and the interior surface of the first peripheral wall define an interior region of the first housing, and the tubes extend within the interior region to the second surface of the first header panel.

3. The drain mast of claim 2, wherein the first peripheral wall has a first end and a distal second end, and the first header panel is integrally formed with the first peripheral wall adjacent the first end of the first peripheral wall.

4. The drain mast of claim 1, wherein the second housing includes a second peripheral wall and a second header panel integrally connected to the second peripheral wall, the second peripheral wall has a second enclosed configuration, and the second header panel has a plurality of second apertures, and each respective fluid path extends through a respective one of the second apertures.

5. The drain mast of claim 4, wherein the second header panel has a first surface and a second surface, and the second peripheral wall has an interior surface and an exterior surface;
wherein the second surface of the second header panel and the interior surface of the second peripheral wall define an interior region of the second housing.

6. The drain mast of claim 5, wherein the second housing further comprises a plurality of drain tube segments, each drain tube segment aligned with a respective one of the second apertures, and each said connector segment is a portion of the respective fluid path extending through the aligned second aperture.

7. The drain mast of claim 4, wherein the second peripheral wall has a first end and a distal second end, and the second header panel is integrally formed with the second peripheral wall adjacent the second end of the second peripheral wall.

8. The drain mast of claim 4, wherein the second header panel includes a first segment and a second segment, the first segment and the second segment collectively forming the second header panel.

9. The drain mast of claim 1, wherein the first housing further comprises a plurality of connector segments, and the second housing further comprises a plurality of drain tube segments, and the drain mast further comprises a plurality of indicators, each indicator associated with at least one of a respective one of the connector segments, a respective one of the drain tube segments, or a respective one of the tubes.

10. The drain mast of claim 1, wherein the unitary structure comprising a single material.

11. A drain mast, comprising:
a single material unitary structure comprising a first housing, a second housing, and a plurality of tubes, wherein the first housing and the second housing are separated from one another and the plurality of tubes extend between the first housing and the second housing;
wherein the unitary structure is configured to provide a plurality of fluid paths through the drain mast, each fluid path extending through the first housing, a respective one of the plurality of tubes, and the second housing;
wherein the first housing includes a first peripheral wall and a first header panel integrally formed with the first peripheral wall, the first peripheral wall has a first enclosed configuration, and the first header panel includes a plurality of first apertures, and each respective fluid path extends through a respective one of the first apertures; and
wherein the unitary structure further comprises a plurality of connector segments extending outwardly from the first header panel away from the plurality of tubes, each connector segment aligned with a respective one of the first apertures, and each said connector segment is a portion of the respective fluid path extending through the aligned first aperture.

12. The drain mast of claim 11, wherein
the second housing includes a second peripheral wall and a second header panel integrally formed with the second peripheral wall, and the second header panel includes a plurality of second apertures, and each fluid path extends through a respective one of the first apertures, a respective one of the plurality of tubes, and a respective one of the second apertures.

13. The drain mast of claim 11, wherein the single material unitary structure comprises an additively manufactured material.

14. A drain mast, comprising:
a first header panel;
a second header panel;
at least one enclosure wall; and
a plurality of tubes;
wherein the first header panel, the second header panel, the plurality of tubes, and the at least one enclosure wall are integrally formed as a unitary structure, and the first header panel is separated from the second header panel, and the first header panel, the second header panel, and the at least one enclosure wall collectively define an enclosed interior compartment, and the plurality of tubes extend between the first header panel and the second header panel within the interior compartment, and the drain mast is configured to provide a plurality of fluid paths through the drain mast, each fluid path extending through the first header panel, one of the plurality of tubes, and the second header panel; and
wherein the unitary structure further comprises a plurality of connector segments extending outwardly from the first header panel away from the plurality of tubes, each connector segment aligned with a respective one of the plurality of tubes, and each said connector segment is a portion of the respective fluid path extending through the first header panel.

15. The drain mast of claim 14, wherein the at least one enclosure wall has a first end and a distal second end, and the first header panel is integrally formed with the at least one enclosure wall adjacent the first end.

16. The drain mast of claim 14, wherein the at least one enclosure wall has a first end and a distal second end, and the second header panel is integrally formed with the at least one enclosure wall adjacent the second end.

17. The drain mast of claim 14, wherein the drain mast is configured to contain fluids disposed outside of the tubes within the interior compartment.

18. The drain mast of claim 17, further comprising a drainage port disposed within the second header panel, wherein the drainage port is configured to receive the fluids disposed outside of the tubes within the interior compartment, and provide a fluid passage outside of the interior compartment.

* * * * *